United States Patent

[11] 3,604,887

[72] Inventor Charles A. Newton
     1335 O Street, Anchorage, Alaska
[21] Appl. No. 28,854
[22] Filed Apr. 15, 1970
[45] Patented Sept. 14, 1971

[54] ROLLER ELECTRODE SOLDERING OR BRAZING DEVICE
     5 Claims, 4 Drawing Figs.
[52] U.S. Cl. .................................................. 219/84
[51] Int. Cl. ................................................ B23k 11/06
[50] Field of Search ................................. 219/81, 82,
                     83, 84; 339/8, 108; 310/239, 242, 245, 247

[56] References Cited
UNITED STATES PATENTS
1,787,039  12/1930  Gibb ............................. 219/81

Primary Examiner—J. V. Truhe
Assistant Examiner—Hugh D. Jaeger
Attorney—James H. Littlepage ABSTRACT: A hand-held soldering device has a rotary electrode through which one side of an electrical circuit is completed to the work when the device is pressed against the work.

PATENTED SEP 14 1971 3,604,887

INVENTOR
CHARLES A. NEWTON

BY *James H. Littlepage*

ATTORNEY 3,604,887

ROLLER ELECTRODE SOLDERING OR BRAZING DEVICE

FIELD OF INVENTION

Electric Heating; Metal Heating; Bonding With Pressure; Roller Electrode, Roller Moves Over Work.

PRIOR ART

Jones U.S. Pat. No. 1,101,448

OBJECTS

The object of this invention is to provide a hand-held device primarily intended for soldering, although adaptable for brazing by the use of a different roller electrode. Essentially, it is intended to provide a roller electrode which rolls along the work, to which work is connected one side of a source of electrical circuit, and which soldering device is connected to the other side of the current source. Generally speaking, such devices are not broadly new, but in this one it is intended to provide in the electrical circuit leading to the roller electrode a brush which is normally disengaged from the roller electrode, and which engages the electrode only when the device is forced against the work. This arrangement not only provides for closing the soldering or brazing current circuit at selected location, but also insures that adequate force will be applied, not only to hold the roller electrode against the workpiece, but also to force the workpiece against another one, so that a firm and uniform bond can be soldered or brazed.

These and other objects will be apparent from the following specification and drawings, in which.

Figures 1, 2:
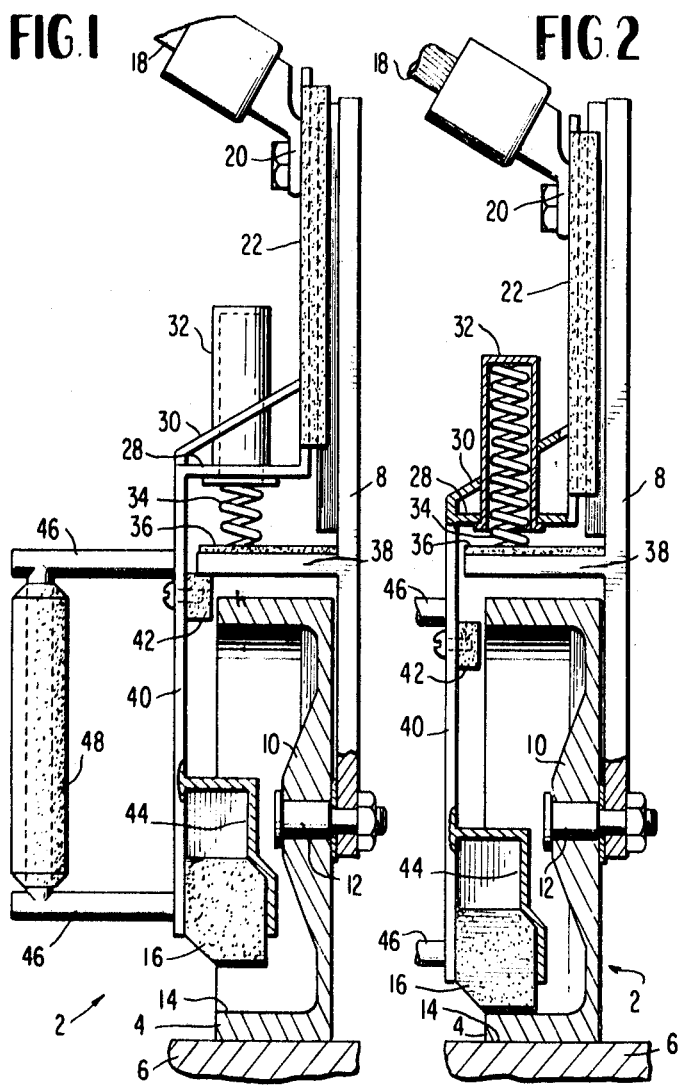
FIG. 1 is a vertical elevation, partly in longitudinal cross section, of the soldering device with the roller engaging a workpiece but with the brush in inoperative position.
FIG. 2 is a view similar to FIG. 1, but showing the brush forced forwardly to operative position.
Figure 3:
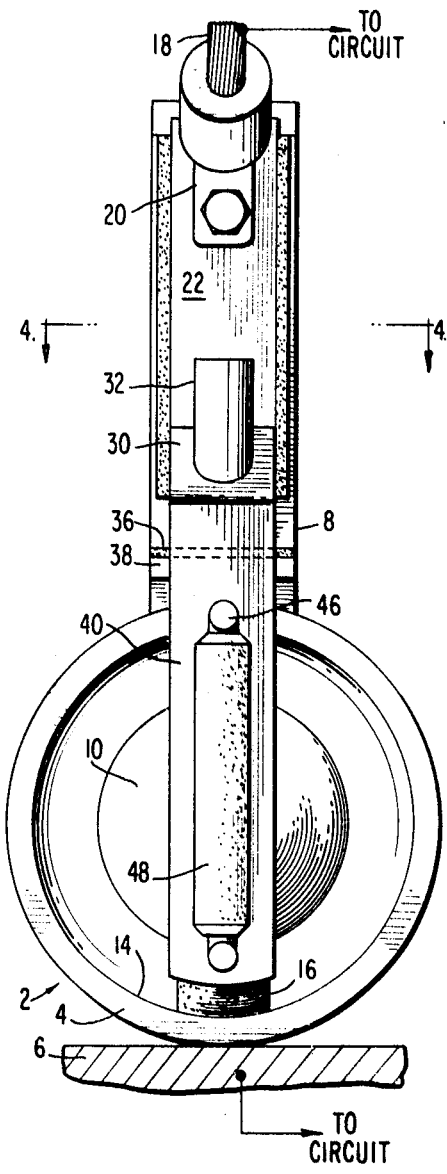
FIG. 3 is a side elevation of the device in the FIG. 2 condition.
Figure 4:
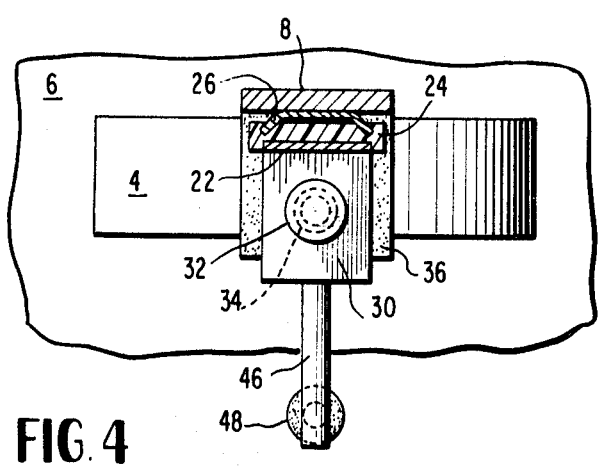
FIG. 4 is a transverse cross section along the line 4—4 of FIG. 3.

Referring now to the drawing, in which like reference numerals denote similar elements, the soldering device 2 comprises a roller electrode 4 which engages and rolls along a metal workpiece 6. It will be understood that workpiece 6 ordinarily engages another piece, not shown, to which one side of a source of electrical circuit is connected if heat is to be generated at the juncture of the workpiece. Alternatively, workpiece 6 may be connected directly to the current source if it is desired to generate heat at the point of surface contact of electrode 4 and a suitable device may be utilized for feeding solder onto the path of the electrode. Ordinarily, for solder work, roller electrode 4, which is rotatably mounted on a chassis 8, would be constructed of brass and a high ampere current of low voltage would be used. For brazing, current of higher voltage would be used, and for the higher degree of heat generated it would be preferable to make the roller electrode of material more heat resistant, such as a metal surfaced with thoriated tungsten The hub 10 of roller electrode 4 is supported as by a bearing member 12 on chassis 8, and engageable against the inner periphery 14 of roller 4 is a brush 16. By comparing FIG. 1 with FIG. 2 it will be apparent that brush 16 and electrode 4 are normally disengaged, and that they make contact only when the brush is forced forwardly against the inner periphery of the roller.

The other side of the current source is connected to brush 16 through a cable 18 which is electrically connected through a terminal 20 to a conductor piece 22. Conductor piece 22 is insulated from but slidably supported on chassis 8 by means of an insulating strip 24 which is affixed to piece 22 and which is reciprocally supported on chassis 8 by means of a track 26.

Upstanding from conductor piece 22 are a frame upright 28 and a diagonal brace 30, in both of which are mounted a tubular socket 32 for the rear end of an expansion spring 34. The forward end of spring 34 bears against an insulating pad 36 on a chassis upright 38 so that, ordinarily, frame upright 28 and the parts rigidly associated therewith (including brush 16) are biased rearwardly from roller electrode 4.

Extending forwardly from frame upright 28 is a frame strip 40, on the lower side of which is fixed an insulating stop 42. Stop 42 engages chassis upright 38 to limit the rearward sliding of the frame under the bias of spring 34. Beneath the forward end of frame strip 40 is a brush holder 44, and supported on frame strip 40 between posts 46 is a handle 48 of insulating material. If desired, posts 46 may also be formed of insulating material.

In operation, the various parts are normally biased by spring 34 to the position shown in FIG. 1, wherein brush 16 is disengaged from the inner periphery 14 of roller electrode 4, and the latter is not in electrical circuit with cable 18 due to the insulating member 42, 36 and 24. However, when handle 48 is forced forwardly against the bias of spring 34, brush 16 makes contact with the inner periphery 14 of roller electrode 4 so that an electrical circuit is completed from cable 18 to workpiece 6 simultaneously with the application of force thereagainst.

I claim:

1. An electrical heating device for soldering or brazing comprising
   a roller electrode having a radially outward facing surface adapted to engage work to be heated,
   a chassis rotatably supporting said roller electrode,
   a frame of electrically conductive material movably connected to said chassis for movement in forward and rearward directions towards and away from the work engaged by said peripheral portion,
   said frame and said chassis being normally insulated from one another,
   spring means engaged between said chassis and frame for biasing the same rearwardly in the direction away from said work, whereby when said radially outwardly facing surface is engaged against said work and said frame is forced forwardly against the bias of said spring means, said outwardly facing surface is forced against said work,
   a conductor electrically connected to said frame and adapted to be connected to a source of electricity,
   and means for establishing an electrical circuit between said frame and said roller electrode when said frame is forced forwardly towards the work against the bias of said spring and for disestablishing said circuit when said spring forces said frame rearwardly away from said work.

2. The combination claimed in claim 1,
   the peripheral portion of said roller electrode comprising an annular flange which also has a radially inward facing surface, the last-named means including a brush which is mounted on said frame and which is engageable with said radially inward facing surface when said frame is moved forwardly.

3. The combination claimed in claim 2, and a handle formed of electrically insulating material on said frame.

4. An electrical heating device for soldering or brazing, comprising
   a roller electrode having an annular flange with a radially outward facing surface adapted to engage and roll along work,
   a chassis rotatably supporting said roller electrode,
   a frame slidably mounted on said chassis for sliding along a path which extends in opposite directions radially of said flange,
   spring means engaged between said chassis and frame for biasing said frame to move in one radial direction,
   said electrode, chassis, frame and spring means being so arranged that when said outwardly facing surface of said electrode is engaged against said work and the frame is forced contra to the bias of said spring means, said surface is forced against said work, and normally open electrical circuit means for closing an electrical circuit to said electrode when said frame is moved contra to the bias of said spring, said annular flange of said roller electrode also having a radially inwardly facing surface, said electrical circuit means including a brush carried by said frame and so disposed as to engage the radially inward facing surface of said annular flange when said frame is moved against the bias of said spring whereby to force the outwardly facing surface of the flange against the work.

5. The combination claimed in claim 4, said frame and said chassis being electrically insulated from one another.